Patented Aug. 18, 1925.

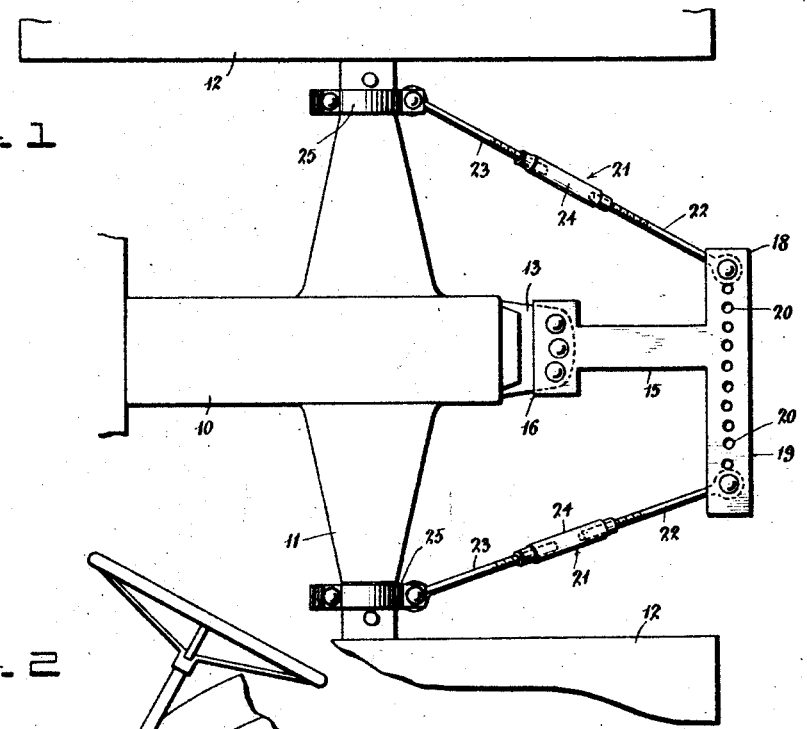
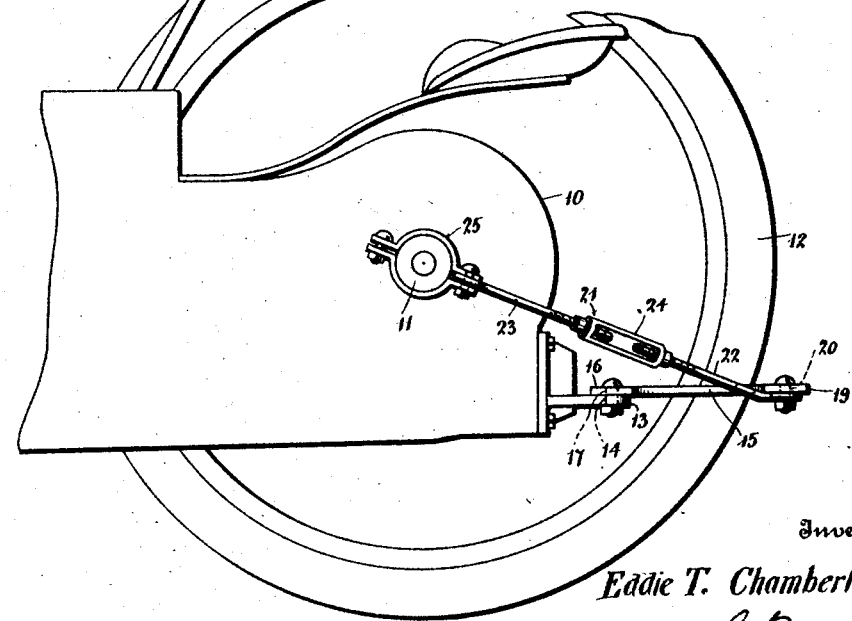

1,550,502

UNITED STATES PATENT OFFICE.

EDDIE T. CHAMBERLAIN, OF ST. MATTHEWS, KENTUCKY, ASSIGNOR OF ONE-HALF TO HARRY W. SIMCOE, OF ST. MATTHEWS, KENTUCKY.

HITCH.

Application filed October 10, 1922. Serial No. 593,603.

*To all whom it may concern:*

Be it known that I, EDDIE T. CHAMBERLAIN, a citizen of the United States, residing at St. Matthews, in the county of Jefferson and State of Kentucky, have invented certain new and useful Improvements in Hitches, of which the following is a specification.

The present invention relates to hitches for use with tractors and the like, and is especially adapted to be used with such tractors as the Fordson tractor.

An object of the invention is to provide a hitch which will position the pivotal point between the tongue or pole of the drawn vehicle or machine and the hitch, so that said tongue or pole will not contact with the wheels of the tractor in any relative turning movement between the drawn and tractor machines.

Another object of the invention is to so construct the hitch device that the connection therebetween and the drawn vehicle may be adjusted.

Still another object is to produce a construction which will be stable and durable and which will be braced against wabbling and other irregular movements.

Referring to the drawings;

Fig. 1 is a plan view of the hitch device shown attached to the draw-eye of a Fordson tractor.

Fig. 2 is an elevation of the same showing the position of the brace members relative to the hitch device proper and to the tractor.

Referring to the drawings in detail:

10 designates the body of a tractor having an axle 11 extending transversely thereof on which are mounted the drive wheels 12. Extending rearwardly from the body of the tractor is the ordinary draw-eye 13 having a plurality of apertures 14 therein. The present invention comprises a bar 15 having a head 16 formed at one end thereof, said head being provided with a plurality of apertures 17 corresponding to the apertures 14 in the draw-eye. To the opposite end of the bar 15 is secured in any suitable manner, or as formed, integral therewith arms 18 and 19 extending transversely from said bar. These arms are preferably of unequal length in order to adapt the hitch device for varying conditions and the arms are provided with a plurality of apertures 20, the purpose of these apertures being to provide for lateral adjustment of the tongue or draft pole of a vehicle or other object to be drawn relative to the line of draft of the tractor.

It will be noted that the length of the hitch device is such that the pivotal point of a vehicle tongue will be located slightly back of the rear of the wheels whereby in turning the tractor in one direction or the other, contact of the tongue of the drawn vehicle with the wheels of the tractor will be avoided. The longer arms of the hitch device will locate a plow, harrow or other similar device in such relation to the tractor that a furrow much closer to a given line as a fence than the tractor is adapted to approach, may be made. In order to give the hitch device rigidity and stability brace members 21 are secured to the ends of the arms 18 and 19. These brace members comprise eye-bolts 22 and 23 having formed on their ends right and left hand threads adapted to fit in threaded apertures in the ends of the turn-buckles 24. The arm 23 has secured thereto draw yokes 25 adapted to be clamped to the axle 11. The brace members are preferably located in an upwardly inclined position as shown in Fig. 2, in order to sustain in a large measure the weight of the tongue hitched thereto.

The improved hitch device is constructed of one piece of material with the bar 15, head 16 and arms 18 and 19 in the same plane, or in flat relation, and by this construction a material reduction in the cost of production ensues, as the device can be cut or stamped out of metal of suitable thickness in one operation. The eye-bolts 22 are applied to the undersides of the terminals of the arms 18 and 19, and through the medium of the turn-buckles 24 the arms 22 and 23 at each side may be adjusted to exert the same bracing stress and insure an equal rigidity and resistance to distortion and breakage relatively to the two arms 18 and 19 irrespective of the distance of the terminals of the latter arms from the extremities of the axle 11. The complete attachment embodying the features of the invention is simple in its general construction and organization and does not require any modification in the parts of the tractor for practical application and operation thereof.

What is claimed as new is:

A hitch for use with tractors and the like of the class specified, comprising a central longitudinally straight bar having a head at its forward end for attachment to the draw-eye of a tractor and laterally extending apertured arms at the rear end thereof, the said arms differing in length from opposite sides of the bar and disposed at right angles to the said bar and having openings therethrough for adjustable purposes, the said arms, bar and head all being flat and in the same plane, and brace members adjustably connected to the arms and to the axle of the tractor.

In testimony whereof I affix my signature.

EDDIE T. CHAMBERLAIN.